United States Patent Office 3,155,616
Patented Nov. 3, 1964

3,155,616
CALCIUM CARBONATE DISPERSIONS
Vanderveer Voorhees, Los Altos, Calif., assignor to Bray Oil Company, Los Angeles, Calif., a limited partnership of California
No Drawing. Filed Oct. 19, 1961, Ser. No. 146,324
7 Claims. (Cl. 252—33)

This invention relates to dispersions of calcium carbonate in oils, particularly colloidal dispersions, in which the particle size is below approximately 0.1 micron, and to a process of making these dispersions. The invention relates more particularly to the manufacture of lubricating oils containing dispersions of calcium carbonate in which the particles are sufficiently small that the oils are transparent to the unaided eye.

In the lubrication of internal combustion engines and other machinery, it has been found that the formation of sludge deposits is associated with the oxidation of the oil and is accelerated by various catalysts, particularly acids formed in the oil from oxidation or acids which are absorbed by the oil, e.g., from the combustion of sulphur and halogen compounds in internal combustion engines. It has also been found that if the acids are neutralized instantly, the rate of sludge formation can be greatly reduced so that the useful life of the oil in the engine is extended far beyond that of the oil which is not protected by neutralizing agents. It has also been found that calcium carbonate is one of the most satisfactory neutralizing agents for the purpose, because of its high water insolubility and the fact that it reacts neutral but is capable of neutralizing all acids encountered in lubricating oils which are stronger than carbonic acid. It is therefore considered to possess "reserve alkalinity."

In order to utilize the valuable protective properties of calcium carbonate, it is necessary that it be dispersed in the oil in such a fine state of subdivision that it will not interfere with the operation of machinery in which the oil is employed as a lubricant. This necessitates that the particle size be sufficiently small that the oil will be transparent to visible light and readily filterable through ordinary filtering media, such as filter paper. When larger particles are present in the oil, making the oil cloudy or murky, there is great danger that abrasion of bearing surfaces will result and the coarse particles may even settle out of the oil on long standing.

A number of processes have been devised for preparing dispersions of calcium carbonate of the desirable characteristics hereinabove referred to. Most of these processes involve precipitation of the calcium carbonate from solutions of calcium salts in the presence of emulsifying agents which act as peptizers to prevent agglomeration of the particles and coagulation of the emulsions. One process as exemplified by the patent of Warren et al. 2,839,470 prepares an emulsion of calcium hydroxide in lubricating oil in the presence of an emulsifying agent, such as oil soluble sulfonate, and then precipitates the calcium carbonate by the action of carbon dioxide. Water is essential to this reaction and close control of the amount of water present is important in producing a satisfactory, transparent, filterable oil product.

Another process largely avoids the presence of water by employing alcohols, especially the lower alcohols of 1 to 6 carbon atoms. This process is exemplified by the patent of Ellis et al. 2,865,956 and the Canadian patent of McMillen et al. 574,161, according to which calcium hydroxide, oil and emulsifying agent, such as petroleum sulfonate or alkyl salicylate, are treated with carbon dioxide. It has also been found, according to Carlyle Patent 2,956,018, that if calcium hydroxide is treated with carbon dioxide in the presence of a lower alcohol of 1 to 5 carbon atoms, a complex compound can be produced which can be dispersed in hydrocarbon oil containing a dispersing agent, such as calcium sulfonate, thereby producing the desired transparent dispersion of calcium carbonate. This process is plagued with numerous mechanical difficulties of handling bulky, solid materials which tend to cake on heating surfaces and deteriorate, with resulting agglomeration to form undesirably large particles, which cannot be tolerated in the lubricating oil product and which can only be removed from the oil with great difficulty owing to their substantially unfilterable particle size range.

In an earlier application of the inventor, Serial No. 853,631, filed November 17, 1959, of which this application is a continuation in part, it was found that when calcium oxide is employed in a reaction of the type shown by Ellis, the only alcohol which was operable in the process was methanol. It was found also that when using calcium oxide, the reaction should be conducted in the substantial absence of water. It was still further found that the activity of calcium oxide varied greatly, depending on its method of manufacture and that the calcium oxide prepared by the roasting of calcium hydroxide was far more active than the ordinary calcium oxide of commerce which is made by roasting calcium carbonate (limestone), usually at a much higher temperature.

I have now discovered that the calcium oxide of commerce made by the roasting of calcium carbonate, calcite, marble or limestone at temperatures upwards of 2000° F. can be activated for the process of preparing calcium carbonate dispersions in oil by "pre-carbonating," i.e., initially treating the calcium oxide in methanol suspension with a controlled amount of carbon dioxide, in the absence of any dispersing agent. I have found that an extremely rapid reaction takes place between carbon dioxide and calcium oxide in suspension in methanol and that if the amount of carbon dioxide is held within the range of about 5% to 50% of the stoichometric amount required to react completely with the calcium oxide, the activity of the calcium oxide is greatly increased so that substantially complete absorption of the calcium oxide by the oil and methanol in a later stage of the process can be effected. This is an extremely important consideration in the process inasmuch as unused or unreacted (undissolved) calcium oxide must be filtered from the oil at considerable expense owing to the extreme difficulty of filtering calcium oxide suspensions, particularly after treatment with water has converted the oxide to colloidal hydroxide. Some of these suspensions of calcium hydroxide in oil, particularly in the particle size range of 1 to 100 microns, are substantially unfilterable when present in random particle sizes.

It is desirable to limit the precarbonation to not more than 50% of the carbon dioxide requirement to avoid gelling the calcium oxide-methanol mixture which often occurs when carbonating the mixture to completion unless large volumes of methanol are used. I prefer to employ only about 10% to 30% of the stoichometric amount of carbon dioxide required to convert the calcium oxide to calcium carbonate, taking into account the purity of the calcium oxide employed, usually about 90% to 95%. With the precarbonation treatment, I find I can reduce the methanol to about ½ to 2 volumes per volume of oil-dispersant employed, while avoiding gelling. After addition of the oil and dispersant, no further tendency to get is encountered and the reaction with carbon dioxide proceeds rapidly, owing to the activation effect of the carbon dioxide treatment before the addition of oil and dispersant.

The calcium oxide should be finely ground to pass a 100 mesh screen. The more finely ground oxide, passing 200 mesh and even 300 mesh, is even more desirable, inasmuch as it can be more easily mixed with the liquid components of the reaction mixture. In the activation stage of my process, the ratio of calcium oxide to methanol is usually from 10 to 30 parts of calcium oxide to 100 parts of methanol by weight.

For most purposes this invention applies to the dispersion of calcium carbonate in petroleum lubricating oils and generally oils within the motor oil viscosity range SAE 5 to SAE 60. However, I can also employ oils adapted for special uses, such as the hydraulic oils with viscosities as low as 100 seconds Saybolt at 100° F. and synthetic hydrocarbon oils of the character of polyolefins, particularly polypropylene and polybutylene. The invention can also be applied to non-hydrocarbon oils, as typified by the polyethers and the esters. In the latter class may be mentioned the esters of di-basic acids, such as dinonyl, dilauryl and dioctyl adipate, azelate, sebacate, phthalate and the like. The fatty oils such as the fatty acid glycerides and glycol esters can also be treated according to my invention as well as the esters of trimethylol propane and similar polyfunctional alcohols.

The dispersing agents which I prefer to use in my process are the oil soluble sulfonates, particularly the petroleum sulfonates, commonly called "mahogany sulfonates." Alkylnaphthalene sulfonates, such as di-nonyl naphthalene sulfonate, can also be used as dispersants, and also the alkyl benzene sulfonates of upwards of 20 carbon atoms. The latter are generally made by alkylation of benzene with olefins such as polypropylene and polybutylene, followed by sulfonation. Alkylates of benzene or naphthalene with olefins derived from the thermal cracking of paraffin wax can also be sulfonated and employed as dispersants in my process. Alkyl salicylic acids of more than 20 carbon atoms may likewise be employed as dispersants, as may also the high molecular weight fatty acids, such as oleic acid, stearic acid, arachidic acid, and erucic acid. The napthenic acids obtained from the extraction of petroleum oils with alkalis are also useful as dispersants, and the resin acids characterized by abietic acids can similarly be used in the form of their compounds with metals.

Although I may employ the dispersants in the form of free acids which are subsequently neutralized by the calcium oxide employed in my process, I prefer to employ the dispersants in the form of their soaps with metals, preferably with calcium, although salts with other metals such as barium, magnesium, lithium, sodium and potassium may also be used. The amount of the dispersant varies considerably with the product which is intended and, to a large extent, controls the ultimate amount of calcium carbonate which can be introduced. Thus I find that when petroleum mahogany sulfonate is employed in the form of its calcium soap in a concentration of about 40% in lubricating oil, I can introduce as much as 33% of calcium oxide, giving an oil having a sulfated ash of approximately 50%. The sulfated ash is determined by burning a sample of the oil in the usual manner and treating the ash with an excess of sulphuric acid to convert all the calcium and other metals present to sulfate on final ignition.

In carrying out my process, it is essential to employ thorough mixing of the oil, methanol and calcium oxide while introducing carbon dioxide. The separate gas, liquid and solid phases are thus emulsified and undesired side reactions are minimized. Because of the high viscosity of some of the oils employed, e.g., oils of SAE 30 to SAE 60 or even bright stocks, it is desirable to reduce the viscosity by adding a solvent or diluent such as a petroleum hydrocarbon thinner or "naphtha." Various naphthas can be used for this purpose such as Stoddard solvent or kerosene but for convenience in recovering the solvent by distillation I prefer to employ a narrow boiling range naphtha known as varnish maker's and painter's naphtha (VM & P), having a boiling range of about 250° to 300° F. I may also use an aromatic naphtha derived from petroleum corresponding generally to xylene in volatility characteristics. Aromatic solvents, such as benzene, toluene, and xylene, can also be used and I can also employ the chlorinated solvents such as carbon tetrachloride and trichlorethylene, which can easily be recovered from the lubricating oil product for reuse in the process. The amount of solvent employed is usually of the order of ½ volume to 2 volumes of solvent per volume of oil processed.

The dispersing agent and solvent are most conveniently blended wtih the oil before mixing with the methanol and the calcium oxide. The reaction is exothermic and it is generally desirable to begin the reaction at a temperature well below the boiling point of methanol in order to reduce the amount of cooling required in the process, particularly where the reaction is carried out at atmospheric pressure. It is desirable, however, to begin the reaction at a temperature of 70° F. or above, as the reaction rate at lower temperature is frequently too slow for practical operation. In a typical reaction, the temperature may rise from about 80 to 100° F. up to the boiling point of methanol, which is about 150° F. at atmospheric pressure. Cooling can be applied to the reaction either by means of a cooling coil or by evaporation of methanol from the reaction, the vapors of which are subsequently condensed and re-used in the process.

Because it is essential that the oil product be clear and free from suspended solids, it is usually desirable to subject it to filtration as the final step in the process after removal of methanol and solvent. Heating the oil to a temperature of 400° is usually sufficient to eliminate the solvent unless a high boiling solvent, such as kerosene, is used, in which case heating in vacuo is desirable. Steam stripping can also be employed to aid solvent removal. Filtration and clarification of the oil is most conveniently accomplished by mixing with a suitable filter aid such as diatomaceous earth. Much of the earth commonly entering the market for this purpose is known as "Filter Cel," "Dicalite," "Super-Cel" and "Hyflo."

After the reaction with carbon dioxide, calcium oxide, oil, dispersant and methanol is terminated, either as a result of complete solution of the calcium oxide or inactivity of the calcium oxide employed and the methanol has been removed from the process by distillation, it is desirable to treat the product with water, usually hot water or wet steam, as described in my earlier Patent Application 853,631. The water treatment, preferably applied before removal of hydrocarbon solvent, has the effect of reversing what appears to be an oil-in-water type emulsion and simultaneously releasing methanol, which appears to be combined or complexed with the calcium and dispersant. The water treatment has the valuable effect of greatly reducing the viscosity of the product which, without the water treatment, is frequently of a gelatinous nature, sometimes setting up on standing to a grease-like solid. The amount of water employed is ordinarily about 1% to 20% of the volume of the oil.

When using sulfonates as dispersants, I prefer to employ the purified petroleum sulfonates made substantially in accordance with the patents of Bray 2,453,690 and 2,689,221. Sulfonates made by this process are purified by treatment with butyl alcohol solutions in water to remove undesirable inorganic salts, which are detrimental in the final product.

The following examples will further serve to illustrate the process:

*Example 1*

A sample of calcium oxide was obtained from the Chemical Manufacturing Company, who prepared it by roasting limestone in a continuous kiln at a temperature of about 2,200° F. This oxide is known in the trade as "very hot," i.e., it reacts very rapidly with water to form the calcium hydroxide commonly used in the cement, wallboard and plastering industry. Thirty grams of this oxide, which had been ground in a mortar, was combined with 100 cc. of methanol, 200 cc. of naphtha (250° F. boiling point) and 200 gm. of calcium mahogany soap containing approximately 40% of soap, in lubricating oil. The mixture was rapidly stirred while a stream of carbon dioxide gas was injected, the temperature being maintained at 120 to 130° F. There was very little increase in temperature resulting from the reaction and the carbon dioxide treatment was continued for two hours. The mixture was rapidly filtered on a suction funnel and the methanol was evaporated from the filtrate to a temperature of 220° F. Water was added, the resulting emulsion was stripped of solvent and dehydrated at 340° F. and the oil finally filtered while hot. Titration with standard acid solution indicated an alkali value of 1.4 (mg. KOH per gm.) using phenolphthalein indicator and 124 with methyl orange indicator. The theoretical alkali value for this amount of oxide, 15%, is 230. Thus only about 54% of the oxide reacted under these conditions where all ingredients were mixed before introducing carbon dioxide. These results indicate that much of the calcium oxide employed in the reaction was inactive.

*Example 2*

Another sample of calcium oxide was obtained from the Oro Grande Lime Company of Colton, California, the oxide having been prepared by roasting limestone at a temperature of about 2,400° F. Analsyis of this calcium oxide is as follows:

| | Percent |
|---|---|
| Alumina | 0.5 |
| $Fe_2O_3$ | 0.05 |
| CaO | 95.7 |
| MgO | 2.0 |
| $CO_2$ | 0.3 |
| Silica and insolubles | 0.7 |

This oxide was ground to pass a 300 mesh screen and was used in the following reaction:

25 grams of the oxide was mixed with 150 cc. warm methanol; 100 grams of calcium mahogany soap containing approximately 35% of soap in lubricating oil was diluted with 100 cc. of xylene and rapidly mixed with the oxide and methanol in a Waring turbine mixer while introducing carbon dioxide gas. The temperature was held at 142° F. for 10 minutes while mixing at full speed. The speed was then reduced to half and carbon dioxide continued for one hour, the temperature falling to 124° F. The mixture was then heated in a pan on the hot plate to 220° F. to expel methanol and then filtered with the aid of Hyflo. The filtrate was not clear, indicating much fine material had passed through the filter paper. The filtrate was repeatedly filtered with standard Super-Cel, then treated with water to form an emulsion which was dehydrated at 380° F. The oil was then filtered hot and titrated. The alkali value was 98 with methyl orange whereas the theoretical alkali value for the amount of calcium oxide used was 329, indicating that the utilization of oxide was only about 30%. The oil was cloudy in appearance and on dilution with naphtha gave a muddy solution.

*Example 3*

40 gm. (0.68 mol based on 95% purity) of the calcium oxide was mixed with 150 cc. methanol and 75 cc. VM & P naphtha. While agitating, carbon dioxide was passed into the mixture at the rate of one liter per minute for one minute (0.045 mol). The temperature rose from 125° to 140° F. To the activated oxide mixture was then added rapidly 150 gm. calcium mahogany soap—40% in 60% lubricating oil and thinned with 75 cc. naphtha. In ten minutes' stirring with carbon dioxide (1 liter/min.) the temperature rose to 147°, then subsided. After 25 minutes the reaction was terminated. During the reaction there was added 50 cc. more methanol and 100 cc. more naphtha to compensate for that lost by evaporation.

The mixture was heated on the hot plate with some difficulty owing to caking and sticking. At 200° when most of the methanol was evaporated, there was added 25 cc. water which served to disintegrate the coagulated gel and give a thin emulsion. This was heated to 265° F. to remove water, then filtered to a clear solution which was heated to 350° F. to remove solvent, giving a clear, red oil. The alkali value (methyl orange) of this oil was 256 which is 75 percent of the theory (340). This illustrates the advantage resulting from activation of the calcium oxide with carbon dioxide in methanol. The amount of carbon dioxide employed in the activation was 6.6% of the stoichiometric equivalent for carbonating the calcium oxide.

*Example 4*

In this run, 20.5 pounds of the same calcium oxide as used in Example 3 was slurried in 10 gallons of methanol, and carbon dioxide was passed in until 5 pounds had been absorbed, the temperature reaching 136° F. There was then added 100 pounds of a lubricating oil solution containing about 35% of calcium mahogany sulfonate, diluted with 20 gallons of petroleum xylene (solvent naphtha "B"). Carbon dioxide was continued and samples were taken as follows, separately filtered and processed to a solvent-free oil.

| Total $CO_2$ introduced: | Alkali value—methyl orange |
|---|---|
| 8 pounds | 132 |
| 16 pounds | 164 |
| 20 pounds | 192 |

The temperature at the end of the run fell to 91° F. in four hours. The final product was clear, filtered rapidly and was free from gel. The initial activation of the calcium oxide in methanol used 25% of the total carbon dioxide employed in the reaction.

*Example 5*

To 3135 gallons of methanol and 3675 gallons of petroleum xylene recovered from a previous operation, was added 3000 lbs. of calcium oxide (95% CaO) ground to pass 300 mesh. The oxide was obtained from the Oro Grande Lime Company and was made by roasting limestone at about 2200° F. Into the suspension was injected 400 lbs. of carbon dioxide while thoroughly mixing by circulating from the bottom of the reaction vessel through centrifugal pumps and back to the vessel. The carbon dioxide was injected into the circulating line and was completely absorbed by the suspension, over a period of 15 minutes. This is equivalent to 18% of the stoichiometric amount required to convert the oxide to carbonate.

To the activated oxide suspension was next added 2566 gallons of a solution of calcium mahogany sulfonate in oil diluted with 50% by volume of xylene solvent. The lubricating oil-sulfonate solution (1283 gals.) contained 35% calcium sulfonate in oil. Carbon dioxide was then introduced into the mixture for a period of 55 minutes until a total of 1400 lbs. of carbon dioxide had been added. The temperature increased from 80° to 140° F. during the reaction and cooling was provided to avoid distillation of methanol.

Methanol was distilled off at the end of the reaction by heating to a temperature of 275° F., a portion of the xylene solvent distilling and serving to strip out the methanol completely. The distillate contained from 26 to 28% of xylene solvent. The reaction mixture was then cooled to 190° F. and 70 gallons of water was added to break the gel structure in the product. The water was then distilled off by heating to 250° F. and the product then cooled and filtered with the aid of about 2% of diatomaceous earth. The clear solution of oil and solvent was then heated and steamed at 300° F. to remove the solvent. The product oil had an alkali value of 7 to phenolphthalein indicator and 265 to methyl orange. The specific gravity was 1.08 corresponding to 9 lbs. per gallon.

Example 6

Into a mixture of 200 cc. methanol and 30 gm. calcium oxide from burning of limestone—300+mesh— was passed a current of carbon dioxide at the rate of 1 liter per minute for a period of 2 minutes. The temperature rose from 90° to 117° F. To the reaction was then added 100 gm. of a 35% solution of calcium mahogany sulfonate in lubricating oil, diluted with 100 cc. of petroleum xylene. Rapid agitation of the mixture was continued while the carbon dioxide was introduced. Following are the temperatures observed:

| Time, Minutes | 1 | 3 | 7 | 9 | 13 |
|---|---|---|---|---|---|
| Temp., °F | 128 | 136 | 144 | 140 | 120 |

Additional xylene solvent was added during the reaction as the mixture thickened.

After 13 minutes from the time of adding the sulfonate to the pretreated lime and methanol, the methanol was evaporated to a temperature of 210° F. Then 30 cc. of water was added with stirring. The thick oil instantly granulated, then became a thin, fluid emulsion which could be dehydrated by heat without gelatinization. At 400° F., the oil was filtered with the aid of Hyflo.

Alkali value _____ 33 (phenolphthalein),
345 (methyl orange).
Theory for 95% CaO purity ___ 370.
Percent use of CaO _____ 93.4%.

Although I have described my invention with respect to specific embodiments thereof, I intend it to be encompassed by the claims which follow. Where the term "oil" is used it has the usual meaning of a viscous liquid immiscible with water, derived from animal, mineral, vegetable or synthetic sources.

When removing methanol from the reaction mixture, it is sometimes desirable to strip the mixture by introducing hydrocarbon vapor such as vapor of VM & P naphtha or xylene, thereby avoiding caking the product on hot surfaces which sometimes happens before the water treatment. Paraffinic type naphtha is not completely miscible with methanol and the methanol and the methanol layer can be easily separated for re-use.

In a continuous activation apparatus, I prefer to make a slurry of calcium oxide in methanol, for example 80 lbs. per 100 gallons, and introduce carbon dioxide into a stream of the slurry while pumping it through a mixer and into a reaction vessel containing the oil and dispersant. In this way I am able to reduce the time in the activation stage to a matter of seconds, for example, 5 to 300 seconds, thereby still further avoiding the danger of gelling before contacting the oil. The carbon dioxide can be added in the form of gas or liquid. In the latter case, the liquid instantly vaporizes in contact with the methanol-lime slurry and part of the heat of reaction is absorbed by the latent heat of vaporizing carbon dioxide. The activation reaction can easily be controlled by the temperature increase, usually about 30 to 60° F.

The mechanism of activation of calcium oxide by carbon dioxide is not understood but it is believed that each particle of calcium oxide is attacked, forming a reactive center of calcium oxide-methanol complex which continues to react in the presence of oil and dispersant, somewhat analogous to the development of silver bromide grains in photography, once the grains have been activiated by a light ray. If the unreactive calcium oxide from burning limestone is first surrounded by oil and dispersant, it is isolated from contact with carbon dioxide and methanol and hence fails to react, even after many hours of contact.

Having thus described my invention, what I claim is:

1. The process of making a transparent, colloidal dispersion of calcium carbonate in oil which comprises mixing anhydrous methanol and finely divided calcium oxide derived from burning calcium carbonate in the ratio of about 10 to 30 parts of oxide to 100 parts of methanol by weight, introducing carbon dioxide in an amount of 5 to 50% of that amount stoichometrically required to convert the oxide to carbonate, thereby activating the suspended oxide without forming a gelatinous solid complex, mixing the fluid activated oxide suspension with an oil and an oil soluble dispersant selected from the class consisting of the sulfonic and carboxylic acids having upwards of 12 carbon atoms and their salts, continuing the treatment with carbon dioxide gas until no further gas is absorbed, removing the methanol by distillation, thereafter treating with water to disintegrate gel, then dehydrating the oil containing colloidally dispersed calcium carbonate.

2. The process of claim 1 wherein the dispersant is a calcium salt of an oil soluble sulfonic acid.

3. The process of claim 1 wherein the oil is a petroleum lubricating oil.

4. The process of claim 1 wherein the oil is an ester of a dibasic acid.

5. The process of claim 1 wherein a hydrocarbon solvent is present in admixture with said methanol, oxide, oil, dispersant and carbon dioxide in amount sufficient to reduce the viscosity of the oil and thereby facilitate intimate mixing.

6. The process of making a transparent dispersion of calcium carbonate in mineral lubricating oil suitable for use as a motor oil additive which process employs relatively inactive calcium oxide derived from roasting limestone, comprising treating said calcium oxide in the form of a fine powder suspended in anhydrous methanol in the ratio of about 10 to 30 parts of oxide per 100 parts of methanol by weight with carbon dioxide until about 0.25 mole of carbon dioxide per mole of calcium oxide has been added, thereby activating the calcium oxide without forming a troublesome solid gel, immediately mixing the activated oxide suspension with a solution of calcium mahogany sulfonate in lubricating oil while agitating the mixture to produce an emulsion, the weight ratio of calcium oxide to oil and sulfonate being about 1/5 to 1/3, continuing the introduction of carbon dioxide until no further absorption takes place, distilling substantially all the methanol from the reaction mixture, thereafter treating the oil with 1 to 20 percent of water to disintegrate gel formed on removal of methanol, then dehydrating the product and filtering to remove any contaminating solid particles present.

7. The process of claim 6 wherein the oil employed in the reaction is diluted with 0.5 to 2 volumes of a voltaile hydrocarbon solvent and said solvent is removed by distillation following said water treatment.

References Cited in the file of this patent

UNITED STATES PATENTS

| 2,865,956 | Ellis et al. | Dec. 23, 1958 |
| 2,956,018 | Carlyle et al. | Oct. 11, 1960 |
| 3,021,280 | Carlyle | Feb. 13, 1962 |
| 3,027,325 | McMillen et al. | Mar. 27, 1962 |

FOREIGN PATENTS

| 209,175 | Australia | July 2, 1957 |
| 789,820 | Great Britain | Jan. 29, 1958 |
| 818,323 | Great Britain | Aug. 12, 1959 |